US012268325B2

(12) United States Patent
Pacault et al.

(10) Patent No.: US 12,268,325 B2
(45) Date of Patent: Apr. 8, 2025

(54) CAPSULE SYSTEM WITH RECOGNITION MEANS AND ADAPTABLE OPENING AND INJECTION MECHANISM

(71) Applicant: SOCIETE DES PRODUITS NESTLE S.A., Vevey (CH)

(72) Inventors: Jean Pacault, Granges Narboz (FR); Christian Talon, Vufflens-le-Chateau (CH); Christophe Sebastien Paul Heydel, Chez-le-Bart (CH); Nicolas Gres, Echenevex (FR)

(73) Assignee: Societe des Produits Nestle S.A., Vevey (CH)

( * ) Notice: Subject to any disclaimer, the term of this patent is extended or adjusted under 35 U.S.C. 154(b) by 839 days.

(21) Appl. No.: 17/290,521

(22) PCT Filed: Oct. 31, 2019

(86) PCT No.: PCT/EP2019/079857
§ 371 (c)(1),
(2) Date: Apr. 30, 2021

(87) PCT Pub. No.: WO2020/089404
PCT Pub. Date: May 7, 2020

(65) Prior Publication Data
US 2022/0007879 A1    Jan. 13, 2022

(30) Foreign Application Priority Data
Nov. 1, 2018   (EP) .................................... 18203978

(51) Int. Cl.
*A47J 31/36*   (2006.01)
*A47J 31/44*   (2006.01)
*A47J 31/52*   (2006.01)

(52) U.S. Cl.
CPC ....... *A47J 31/3628* (2013.01); *A47J 31/4492* (2013.01); *A47J 31/52* (2013.01)

(58) Field of Classification Search
None
See application file for complete search history.

(56) References Cited

U.S. PATENT DOCUMENTS 9,295,357 B2 *   3/2016   Tinkler ..................... A23F 3/18
9,307,860 B2 *   4/2016   Burrows ............. A47J 31/3695
(Continued)

FOREIGN PATENT DOCUMENTS

CN   101588974 A   11/2009
CN   103025215 A   4/2013
(Continued)

OTHER PUBLICATIONS

Japanese Office Action for Appl No. 2021-521782 dated Jun. 20, 2023.
(Continued)

*Primary Examiner* — Thor S Campbell
(74) *Attorney, Agent, or Firm* — K&L Gates LLP (57) ABSTRACT

The invention relates to a beverage preparation device (100) for preparing a beverage upon interaction of ingredients provided in a capsule (5) with liquid supplied thereto, the device comprising an injection module (10) comprising a first (1) and a cooperating second enclosing member (2) designed for being moved relatively to each other, the first enclosing member being equipped with capsule opening and injection means (3) for opening a first inlet face (5*a*) of a capsule (5) and inject liquid into the capsule, the first and second enclosing member (1,2) being designed for being brought into at least a first capsule insertion position for inserting a capsule between the enclosing members (1,2) and a second capsule enclosing position in which the opening
(Continued)

and injection means (3) engage the liquid inlet face (5a) of the capsule (5), the device (100) further comprising control means (13) designed for setting at least the capsule enclosing position based on information read from the capsule and/or based on information provided by a user input.

13 Claims, 4 Drawing Sheets

(56) References Cited

U.S. PATENT DOCUMENTS

| | | | | |
|---|---|---|---|---|
| 9,918,586 | B2* | 3/2018 | Smith | A47J 31/4492 |
| 10,499,761 | B2* | 12/2019 | Dos Santos | A47J 31/407 |
| 10,737,876 | B2* | 8/2020 | Krüger | B65D 85/8061 |
| 10,863,860 | B2* | 12/2020 | Kuang | A47J 31/4403 |
| 10,966,562 | B2* | 4/2021 | Krinitchko | A47J 31/057 |
| 11,148,926 | B2* | 10/2021 | Krüger | A47J 31/407 |
| 2015/0201790 | A1* | 7/2015 | Smith | A47J 31/3695 |
| | | | | 426/431 |
| 2017/0079471 | A1 | 3/2017 | Riefenstein | |

FOREIGN PATENT DOCUMENTS

| | | |
|---|---|---|
| CN | 108366689 A | 8/2018 |
| CN | 108601477 A | 9/2018 |
| EP | 2071987 | 6/2009 |
| JP | 2013529956 A | 7/2013 |
| JP | 2017511729 A | 4/2017 |
| JP | 2017148511 A | 8/2017 |
| JP | 2017534348 A | 11/2017 |
| RU | 2484750 C2 | 6/2013 |
| WO | 2011045175 | 4/2011 |
| WO | 2015109052 | 7/2015 |
| WO | 2015109062 | 7/2015 |
| WO | 2018026276 A1 | 2/2018 |

OTHER PUBLICATIONS

Chinese Office Action for Chinese Appl No. 201980067489.5 dated Sep. 29, 2022.
1 Russian Office Action for Appl No. 201114782/03 dated Feb. 9, 2023.

* cited by examiner

CAPSULE SYSTEM WITH RECOGNITION MEANS AND ADAPTABLE OPENING AND INJECTION MECHANISM

CROSS REFERENCE TO RELATED APPLICATIONS

The present application is a National Stage of International Application No. PCT/EP2019/079857, filed on Oct. 31, 2019, which claims priority to European Patent Application No. 18203978.4, filed on Nov. 1, 2018, the entire contents of which are being incorporated herein by reference.

FIELD OF THE INVENTION

The present invention relates to the field of beverage preparation devices using capsules holding beverage ingredients for preparing a beverage upon liquid injection thereto. In particular, the invention relates to a system comprising a beverage preparation device and a capsule, the device being equipped with opening and injection means that are adaptable dependent on a particular capsule inserted into the device.

BACKGROUND AND OBJECT OF THE INVENTION

Devices for preparing a beverage upon feeding liquid such as pressurized water into a capsule inserted into a receiving chamber of the device are widely available and well-known on the market. The dedicated capsules are designed for being used with specific machines and usually hold a predefined amount of nutritional ingredients for preparing a single-serve beverage portion such as a coffee beverage upon reconstitution with liquid.

EP 1 767 129 discloses a common example for a device for preparing a beverage from a capsule. The device comprises a capsule receiving chamber in which the capsule can be inserted or placed by a consumer. The device further comprises a beverage brewing chamber with two enclosing members that are movable with respect to each other in order to enclose the capsule therebetween. Thereby, an upper enclosing member is equipped with injection means for piercing and injecting liquid into a first inlet face of the capsule and a lower enclosing member is provided with means for opening a second outlet face of the capsule upon pressure increase with the capsule interior in order to drain the resulting beverage therefrom.

The known beverage preparation devices suffer the drawback that the relative position of the movable capsule enclosing members in their closed position is predefined according to a standard configuration of the device. Accordingly, the pressure exerted by the enclosing members on the capsule as well as the relative location of the injection means with respect to an inlet face will remain constant in every single beverage preparation process with the device.

Such an arrangement does however not enable to provide for optimal injection and/or extraction parameters for different capsule configurations, in particular for capsules of different packaging material, of different sizes, of different filling and/or compaction degree and/or of varying granulometry of the nutritional particles such as coffee grinds contained therein.

For example, if the upper enclosing member exerts too much force onto the capsule held within the beverage brewing chamber, the capsule's outlet face may be opened by the opening means of the lower enclosing member too early, which results in a not optimal pressure profile during the beverage preparation process and an overcompaction of the ingredients held in the capsule. Further, if the upper enclosing member does not properly contact the inlet face of the capsule or exerts too little force on the capsule, the capsule's inlet face may only be partially pierced, which may result in a loss of extraction yield and crema.

The present invention thus aims at providing a system and a device for addressing the above-indicated problems. It is particular aimed at providing an enhanced device and system for enabling the provision of optimal injection and/or extraction parameters for different capsule types provided to the device.

The present invention seeks to address the above-described problems. The invention also aims at other objects and particularly the solution of other problems as will appear in the rest of the present description.

OBJECT AND SUMMARY OF THE INVENTION

In a first aspect, the invention relates to a beverage preparation device for preparing a beverage upon interaction of ingredients provided in a capsule with liquid supplied thereto, the device comprising an injection module comprising a first and a cooperating second enclosing member designed for being moved relatively to each other, the first enclosing member being equipped with capsule opening and injection means for opening a first inlet face of a capsule and inject liquid into the capsule, the first and second enclosing member being designed for being brought into at least a first capsule insertion position for inserting a capsule between the enclosing members and a second capsule enclosing position in which the opening and injection means engage the liquid inlet face of the capsule, the device further comprising control means designed for adapting the capsule enclosing position based on information read from the capsule and/or based on information provided by a user input.

According to the invention, the respective enclosing position such as in particular a distance between the respective first and second enclosing members may be adjusted to the particular capsule inserted to the device. This enables that the opening and the following beverage injection process can provide for optimal injection and/or extraction parameters for different capsules comprising for example different packaging material, different capsule sizes, different filling and/or compaction degrees and/or ingredients of different granulometry.

In order to provide for different enclosing positions that may be adapted, i.e. determined and set, based on the capsule provided to the device and/or based on a user input, the device is preferably designed for assuming a plurality of different enclosing positions. Thereby, the different enclosing positions vary preferably at least with regards to the distance between the respective first and second enclosing members.

The first and second enclosing member are preferably designed for being moved relatively to each other in linear direction. Thereby, a distance between the first and second enclosing member is preferably varied. The first and second enclosing members may however as well be moved relatively with respect to each other according to a composite trajectory comprising e.g. a portion of linear motion and a portion wherein the respective members are at least partially rotated with respect to each other.

In the first capsule insertion position, the first and second enclosing members are preferably separated by a maximum distance. Accordingly, the capsule inserted into or provided to the beverage preparation device may be received in a free space between the respective first and second enclosing member.

In the second capsule enclosing position, the first and second enclosing members are arranged at closer distance to each other compared to the first capsule insertion position. In this position, the first and second enclosing member engage the capsule, i.e. are arranged adjacent to the respective capsule inlet and outlet face of the capsule. In particular, an inlet face of the capsule is engaged by the opening and injection means of the first enclosing member. In a preferred embodiment, upon bringing the first and second enclosing members into the second capsule enclosing position, the open and injection means open the capsule inlet face such as by piercing, cutting, tearing or the like.

In a preferred embodiment, the control means are designed for further adapting the enclosing position during a beverage preparation process with a capsule in the device based on information read from the capsule and/or based on a user input. In a particular preferred embodiment, the control means are designed for adapting a distance between the first and second enclosing member respectively a penetration depth/force of the opening and injection means into the capsule at least in the capsule enclosing position. Accordingly, the enclosing position and thus the relative position of the first and second enclosing member with respect to each other may be adjusted during the actual beverage preparation process, i.e. before and/or during the liquid injection into the capsule. Thereby, such adjusting is preferably carried out after an initial opening of the capsule in the enclosing position.

In a preferred embodiment, the first and second enclosing member are designed for being brought into at least a third capsule injection position dependent on information read from the capsule and/or based on information provided by a user input. In such position, the distance between the first and second capsule enclosing members is preferably greater than the distance between the enclosing members in the capsule enclosing position.

The capsule injection position is preferably assumed by the first and second enclosing members only during the injection of liquid to the capsule. In such capsule injection position, the opening and injection means are preferably still engaging the inlet face of the capsule. This means that the opening and injection means are still protruding into the opened inlet face of the capsule in sectional side view.

The device according to the invention preferably comprises recognitions means connected to the control means that are designed to read information from the capsule inserted into the device. Notably, such reading of information also encompasses the recognition of a predefined characteristic of the capsule. For this purpose, the recognition means may comprise an optical sensor designed for reading an optical code such as a barcode from a surface of the capsule. The sensor may as well comprise an RFID sensor, a magnetic sensor, an electric, an inductive sensor, a mechanic sensor and/or a CCD sensor suitable for interacting with identification means provided on the capsule and/or for detecting a characterization of the capsule such as a shape and/or size of the capsule or of one of its constituting parts.

The first enclosing member preferably comprises a shower plate comprising a plurality of protruding hollow piercing elements such as needles as opening and injection means. The respective needle elements preferably protrude parallel in the same direction from the shower plate. The respective needle elements preferably protrude to the same extent from the shower plate. The piercing elements are preferably all connected to a joint liquid supply conduit of the enclosing member.

The second enclosing member preferably comprises a support plate with a plurality of protruding structures such as pyramids designed to open an outlet face of the capsule upon pressure increase with the capsule.

The device preferably further comprises means for providing a heated pressurized liquid to the injection module of the device. In particular, the device preferably comprises a pump connected to a liquid supply such as a liquid reservoir. The device preferably further comprises heating means such as a thermoblock for heating a liquid before being provided to the capsule. The liquid provided to the capsule is preferably water.

The device preferably further comprises a user interface for providing information as to the particular capsule or capsule type inserted into the device. Based on this information, the control means of the device may then adapt the particular enclosing position of the first and second enclosing member to the inserted capsule. The user interface may further be designed for selecting a particular beverage to be prepared and/or the volume of the particular beverage. This further information may as well be used by the control means for adapting the particular enclosing position of the first and second enclosing member. In addition, the control means may adapt also the injection position and/or further parameters of the beverage preparation device based on the information provided by the user input.

In a further aspect, the invention relates to a system for preparing a beverage comprising a beverage preparation device as described here-above and at least one capsule containing a predefined amount of beverage ingredients.

The ingredients provided in the capsule are preferably designed for reconstituting a single-serve portion of beverage upon interaction with liquid such as water provided to the capsule. The ingredients are preferably ingredients for preparing a coffee beverage such as a ristretto, espresso or lungo coffee beverage. The ingredients are preferably ground coffee particles present in dry powdered form. The ingredients may however as well be present in different form such as in liquid form. The capsule may as well comprise different ingredients such as ingredients suitable for reconstituting a different beverage such as a tea beverage, a soup or the like.

The capsule according to the invention preferably comprises a beverage inlet face and a beverage outlet face enclosing an inner ingredient chamber. The inlet and outlet face of the capsule is preferably formed by a membrane or foil member made e.g. of aluminium. The membrane or foil member of the inlet and outlet face are preferably sealed together at a circumferentially arranged rim portion of the capsule. The ingredients provided within the capsule are preferably arranged in compressed form. This means that preferably no free space is present within the capsule ingredient chamber, i.e. a free movement of the ingredients particles in the chamber is preferably not enabled.

The capsule preferably comprises an information and/or characterization which can be read by recognition means of the beverage preparation device. The capsule may comprise a code such as an optical code on its outer surface or the like which is designed to be read by a dedicated sensor of the device. The code may comprise information regarding the beverage preparation process parameters and in particular information relating to the respective positions such as the enclosing position to be assumed by the enclosing members of the device when preparing a beverage with the particular capsule. A particular characterization of the capsule may be present by means of its shape and/or size of the capsule which can be recognized by dedicated recognition means of the device. Thereby, dedicated recognition and/or control means of the device are preferably designed to associate information regarding the beverage preparation process parameters and in particular information relating to the respective positions such as the enclosing position to be assumed by the enclosing members of the device to the shape and/or size of the capsule inserted into the beverage preparation device.

The system preferably comprises different types of capsules which differ in their respective shapes and/or sizes, filling degrees, ingredient compaction degree and/or ingredient granulometry. The respective different types of capsule are preferably equipped with different information and/or characteristics to be read by the beverage preparation device. Accordingly, the respective capsule type comprise dedicated information and/or characteristics which enable the beverage preparation device to read said information from the respective capsule and specifically provide optimal injection and/or extraction parameters for the particular capsule.

In a further aspect, the invention relates to a method for preparing a beverage by means of capsule comprising beverage ingredients in a beverage preparation device, the method comprises the steps of:

- inserting a capsule containing a predefined amount of beverage ingredients into the device,
- reading information from the capsule and/or recognizing a characterization of the capsule,
- bringing a first and a cooperating second enclosing member of an injection module of the device from a first capsule insertion position into a second capsule enclosing position in which opening and injection means of the first enclosing member engage and open the liquid inlet face of the capsule, wherein the enclosing position is adapted based on information read from the capsule and/or based on information provided by a user input, and
- injecting liquid into the capsule by means of the opening and injection means.

The step of adapting preferably comprises a determination and a setting of a particular enclosing position by the control means of the device. The determining and setting of the enclosing position may be carried out by directly reading the respective information from the capsule and set a corresponding capsule enclosing position of the device. Alternatively, the information and/or characteristics read from the capsule may be compared with information provided by the device, such as e.g. in a dedicated memory unit. Based on the result of such comparison, the respective position of the first and second enclosing member may then be set by the control means. Thereby, the memory unit may for example comprise a database or correlation tables that link capsule information and/or characteristics of the capsule with beverage process parameters such as the particular positions of the enclosing members. The memory unit may further comprise additional data and/or parameters for preparing a beverage by means of the particular capsule. Alternatively, the respective parameters may be determined and set based on a provided user input such as a selection of a particular capsule type e.g. by means of a user interface of the device.

The method may additionally comprise the step of further adapting the enclosing position after an initial opening of the inlet face of the capsule and before injection of liquid into the capsule, and/or further adapting the enclosing position during the injection of liquid into the capsule. Accordingly, the enclosing position and thus the relative position of the first and second enclosing member with respect to each other may be adjusted during the actual beverage preparation process, i.e. before and/or during the liquid injection into the capsule.

When adapting the enclosing position before the injection of liquid the first and second enclosing members may be brought into a dedicated capsule injection position. In the capsule injection position, the opening and injection means are preferably still engaged with the first inlet face of the capsule, i.e. protrude into the inlet face of the capsule when seen in sectional side view.

An adaption of the enclosing position during the injection of liquid into the capsule may be made in order to further adjust and optimize the injection and/or brewing parameters such as the injection and/or brewing pressure within the capsule. Thereby, such adaption may comprise the step of increasing and/or decreasing a distance between the first and second enclosing members compared to the initial position in which the capsule is opened and/or compared to the capsule injection position. The relative position respectively the distance between the first and second enclosing members may be continuously varied during beverage injection and/or may be varied to assume different distinct positions during liquid injection.

The step of adapting is preferably carried out by the control means of the device dependent on information read from the capsule and/or provided by the user input. As indicated above, the respective information may be read directly from the particular capsule and/or may be determined based on information stored in a dedicated memory unit of the device.

In a particular preferred embodiment, the method further comprises the step of increasing a distance between the first and second enclosing members after the initial opening of the capsule. Such increased distance is preferably provided in the capsule injection position, i.e. in which liquid is then injected into the capsule. The amount by means of which the distance between the first and second enclosing members is increased is preferably determined based on the information read from the capsule and/or by the provided user input, as indicated above. The increase of the distance is preferably carried out before injection of liquid into the capsule. The distance is preferably only increased by such amount that the opening and injection means of the first enclosing member are still engaged with the first inlet face of the capsule. According to such arrangement, any excess pressure onto the inlet face of the capsule and thus onto the ingredients provided adjacent to said inlet face is reduced to a minimum extent and therefore, a negative effect on the beverage preparation process is avoided.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
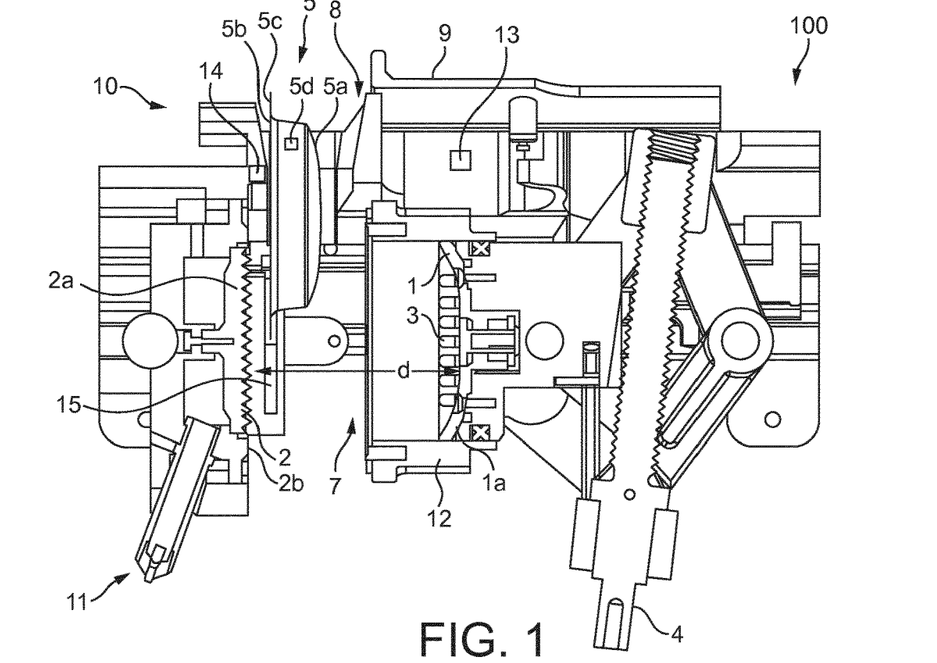
FIG. 1 shows a preferred embodiment of an injection module of a beverage preparation device according to the invention in sectional side view.

FIG. 1 shows a preferred embodiment of an injection module 10 of a beverage preparation device 100 according to the invention in section side view.

The device 100 according to the invention is designed for providing a preferably heated, pressurized liquid to a capsule 5 inserted to the device via the injection module 10. For this purpose, the device comprises a pump, a liquid reservoir and heating means such as a thermoblock (not shown) connected to the injection module 10 in a known manner. The device preferably further comprises user input means such as a touchscreen and/or buttons designed for enabling a user input into the device.

The injection module 10 comprises a first and a cooperating second enclosing member 1,2 designed for being moved relatively to each other. The first enclosing member 1 is preferably connected to activation or drive means 4 designed for selectively moving the first enclosing member 1 with respect to the second enclosing member 2. The second enclosing member 2 is preferably fixedly arranged, i.e. not movable within the injection module 10. The first enclosing member 1 may preferably assume a plurality of different positions with respect to the second enclosing member 2.

The first enclosing member 1 comprises capsule opening and injection means 3 for opening a first inlet face 5a of the capsule 5 and inject liquid into the capsule. The first enclosing member 1 preferably comprises a shower plate 1a with a plurality of protruding hollow piercing elements such as needles as opening and injection means 3. The shower plate 1a may comprise an at least partially concave form in order to enclose the preferably conformably shaped inlet face 5a of the capsule 5. The shower plate may alternatively be of essentially planar form.

The second enclosing member 2 preferably comprises a support plate 2a with a plurality of protruding structures such as pyramids designed to open an outlet face 5b of the capsule 5 upon pressure increase with the capsule.

The beverage preparation device 100 further comprises a capsule insertion slot 8 designed to receive the capsule 5 and for feeding the capsule into a receiving chamber 7 arranged between the first and second enclosing member 1,2, e.g. by means of gravity. The insertion slot 8 may be closed by a cover member 9 of the device.

The device further comprises a beverage outflow means 11 fluidly connected to the second enclosing member 2 and designed to collect the resulting beverage drained from the capsule and guide it towards a beverage receptacle such as a cup of the consumer.

The injection module 10 may further comprise sealing means such as a circumferentially arranged sealing ring 12 designed to selectively enclose the capsule 5 in the receiving chamber 7. Notably, the sealing ring 12 may as well be integrally formed with the first enclosing member 1.

The device further comprises control means 13 designed for adapting, i.e. determining and setting, at least a respective capsule enclosing position of the first and second enclosing member 1,2 dependent on information read from the capsule and/or based on information provided by a user input.

The device preferably further comprises recognitions means 14 connected to the control means 13 and which are designed to read information from the capsule 5 inserted into the device. The recognition means 14 may comprise an optical sensor, an RFID sensor, a magnetic sensor, an electric sensor, an inductive sensor, a mechanic sensor and/or a CCD sensor suitable for interacting with identification means 5d provided on the capsule and/or for sensing a characterization of the capsule such as a shape and/or size of the capsule or of one of its constituting parts.

The capsule 5 (see also FIG. 7) to be used in conjunction with the device preferably comprises an inlet face 5a and outlet face 5b enclosing an inner ingredient chamber. The inlet and outlet face 5a, 5b are preferably formed by a membrane or foil member made e.g. of aluminum. The membrane or foil member of the inlet and outlet face are preferably sealed together at a circumferentially arranged flange-like rim 5c of the capsule. The ingredients provided within the capsule are preferably arranged in compressed form. This means that preferably no free space is present within the capsule ingredient chamber, i.e. a free movement of the ingredients particles in the chamber is preferably not enabled. The capsule preferably comprises identification means 5d that can be read by the recognition means 14 of the device. Such identification means 5d may be provided in the form of e.g. an optical code readable by the recognition means 14 of the device. The identification means 5d may however as well be present in the form of a particular characteristics such as e.g. the form and/or shape of the capsule which can be identified by the recognition means 14 of the device. Based on the information provided by the identification means 5d, the control means 13 connected to the recognition means 14 can determine and set beverage process parameters such as at least a particular capsule enclosing position of the first and second enclosing members 1,2.

FIG. 1 relates to a first capsule insertion position of the first and second enclosing members 1,2 with respect to each other. Thereby, the first and second enclosing members 1,2 are preferably arranged at a maximum possible distance d to each other. This position gives enough free space there between in order to provide a capsule to the receiving chamber 7 situated between the enclosing members 1,2.

As shown in FIG. 1, a capsule 5 may be inserted via the provided capsule insertion slot 8 by a user in order to provide the capsule to the receiving chamber 7. Thereby, the capsule 5 is preferably held at an intermediate capsule recognition position by means of a dedicated capsule support 15 at which position the recognition means 14 may interact with the identification means 5d and/or the characteristics of the capsule such as to enable a recognition of the particular capsule 5 inserted into the device. In an alternative embodiment, the recognition of the capsule may take place during insertion into the receiving chamber 7, i.e. without providing an intermediate capsule recognition position.

Alternatively and/or in addition to the above-indicated arrangement, the user may provide information about the inserted capsule via a dedicated user input means of the device. This information may then be used by the control means for adapting the beverage process parameters and/or the particular positions of the first and second enclosing member during the beverage preparation process.

After recognition, the capsule 5 is brought from the intermediate capsule recognition position into the receiving chamber 7. Thereby, the capsule 5 may for example be urged beyond the previously described capsule support 15 by dedicated actuation means such that the capsule 5 proceeds to the receiving chamber 7 by gravity. In a possible alternative, the capsule support 15 will be moved in a retracted position such that the capsule 5 is no longer held by the support and will proceed to the receiving chamber 7 preferably by gravity.

Figure 2:
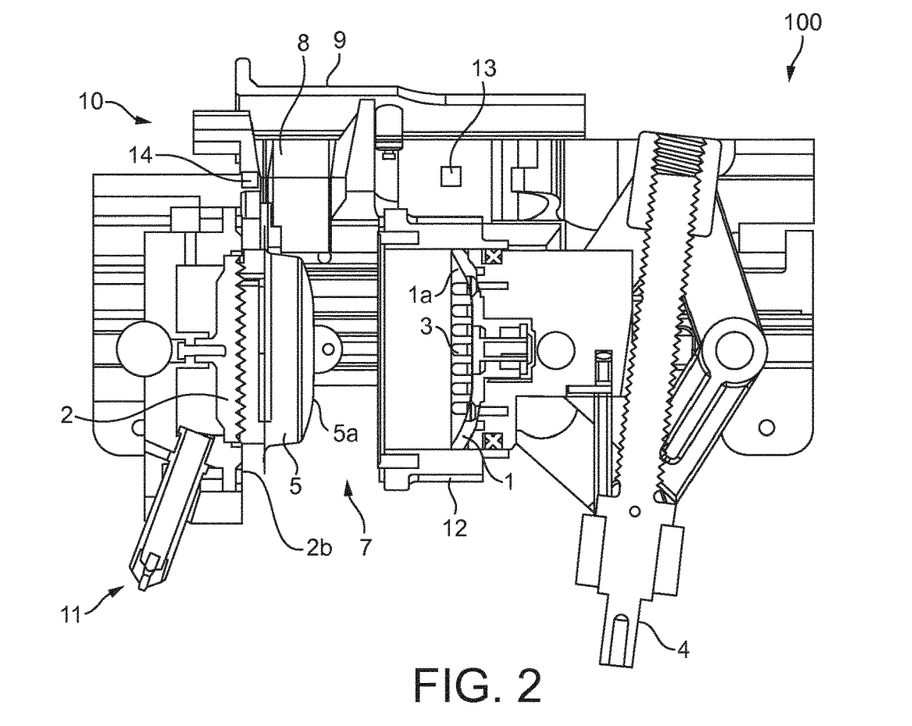
FIG. 2 shows the injection module according to the invention in closed state.

FIG. 2 relates to the position of the capsule in the receiving chamber 7 between the first and second enclosing members 1,2.

Figure 3:
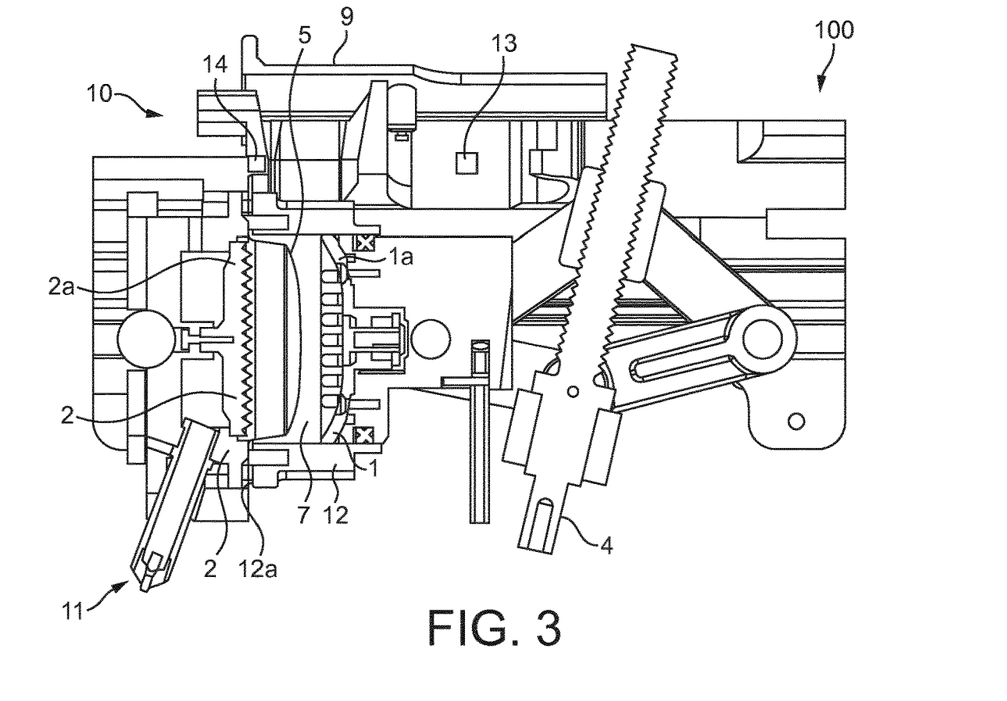
FIG. 3 shows the injection module according to the invention in which the capsule is sealed by a dedicated engagement means.

In a next step as shown in FIG. 3, the capsule 5 is sealingly enclosed in the receiving chamber 7 by means of a circumferentially arranged sealing ring 12. Thereby, a circular front face 12*a* of the ring 12 will sealingly press the flange-like rim 5*c* of the capsule 5 against a preferably circular support face 2*b* arranged at the respective opposite side of the capsule 5. The sealing pressure applied by the sealing ring 12 onto the flange-like rim 5*c* of the capsule is preferably equal for every inserted capsule. In a possible variant, the sealing pressure applied by the sealing ring 12 may as well be varied by the control means 13 based on the information read from the inserted capsule and/or based on the information provided by the user input.

Figure 4:
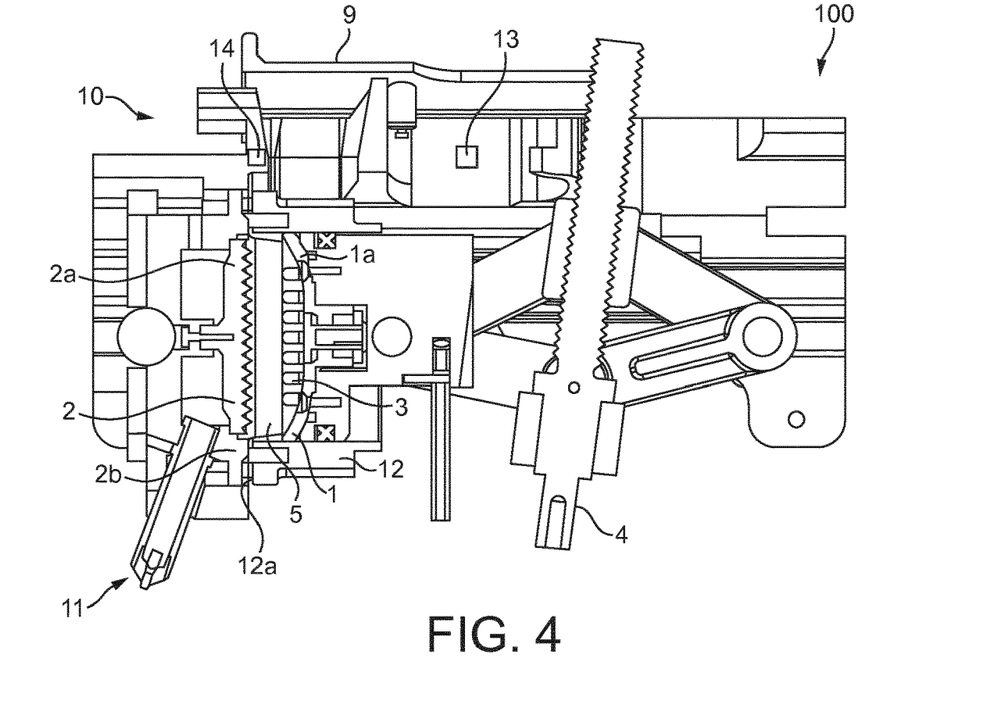
FIG. 4 shows the injection module according to the invention in the capsule enclosing position.

Next, as shown in FIG. 4, the first and second enclosing members 1,2 are brought into the capsule enclosing position in which the opening and injection means 3 of the first enclosing member 1 engage the liquid inlet face 5*a* of the capsule. Thereby, the opening and injection means 3 open the liquid inlet face 5*a* preferably by piercing it.

In this position, the outlet face 5*b* is engaged by the second enclosing member 2. Thereby, the outlet face 5*b* is preferably situated directly adjacent to the support plate 2*a* with the plurality of protruding structures such as pyramids designed to open the outlet face 5*b* of the capsule upon pressure increase with the capsule.

The indicated capsule enclosing position and in particular a specific distance between the first and second enclosing members 1,2 in this position is determined and set by the control means 13 of the device dependent on the particular capsule 5 inserted to the injection module 10 as described above. Accordingly, the pressure applied onto the inlet face 5*a* and the outlet face 5*b* by means of the first and second enclosing member 1,2 in this position can be adapted to the particular capsule inserted. Thereby, also a penetration depth/force of the opening and injection means 3 into the capsule can be adapted to the particular capsule.

Figure 5:
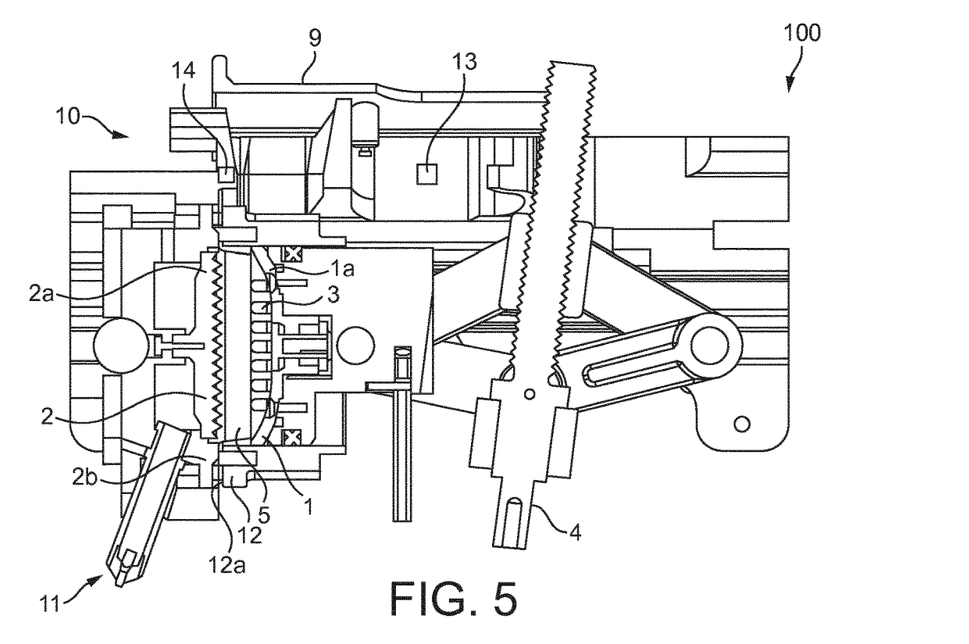
FIG. 5 shows the injection module according to the invention in the capsule injection position.

After the opening of the inlet face 5*a* of the capsule in the capsule enclosing position as shown in FIG. 4 and preferably before any liquid is injected into the capsule, the enclosing member 1,2 may be brought into a capsule injection position as shown in FIG. 5. Thereby, the distance d between the first and second enclosing member 1,2 is preferably increased again. Accordingly, the force applied to the inlet face 5*a* and the outlet face 5*b* of the capsule is reduced to a minimum extent. In addition, sufficient space is provided for the ingredients within the capsule interior during the liquid injection. Notably, in this capsule injection position, the opening and injection means 3 preferably remain engaged with the inlet face 5*a* of the capsule, i.e. still protrude into the inlet face 5*a* when seen in sectional side view. The penetration depth of the opening and injection means 3 is however reduced preferably to a minimum extent.

The particular position of the first and second enclosing member 1,2 in the capsule injection position is preferably also determined and set by the control unit of the device based on the information read from the capsule and/or the information provided by the user input.

During the following liquid injection by the opening and injection means 3, liquid will interact with the ingredients provided in the capsule 5 in order to form a beverage e.g. by means of extraction and/or dissolution. The increasing pressure within the capsule will lead to an urging of the outlet face 5*b* against the protruding structures of the support plate 2*a*, which in turn leads to an opening of the outlet face 5*b* by tearing and/or perforation. The resulting beverage will then be drained from the capsule 5 via the beverage outflow means 11 of the device and may be collected by a dedicated receptacle such as a cup (not shown).

During the liquid injection, the position of the first and second enclosing member 1,2 with respect to each other may remain constant. In an alternative embodiment, the relative position may be further varied by the control means 13 based on the information read from the capsule 5 and/or based on the information provided by the user input. Thereby, the relative position may be continuously varied during beverage injection and/or may be varied to assume different distinct positions during liquid injection.

In addition, the control means 13 may be designed to vary further process parameters such as the injection pressure, the liquid temperature and/or the volume of the provided liquid based on the information read from the capsule 5 and/or based on the information provided by the user input. After the beverage preparation process, the first and second enclosing member 1,2 are brought back into the capsule insertion position as shown e.g. in FIG. 1. Thereby, the used capsule may be discharged from the receiving chamber 7 by means of a dedicated actuator and/or by means of gravity. The device will then be ready to process a further capsule when inserted into the device.

Figure 6:
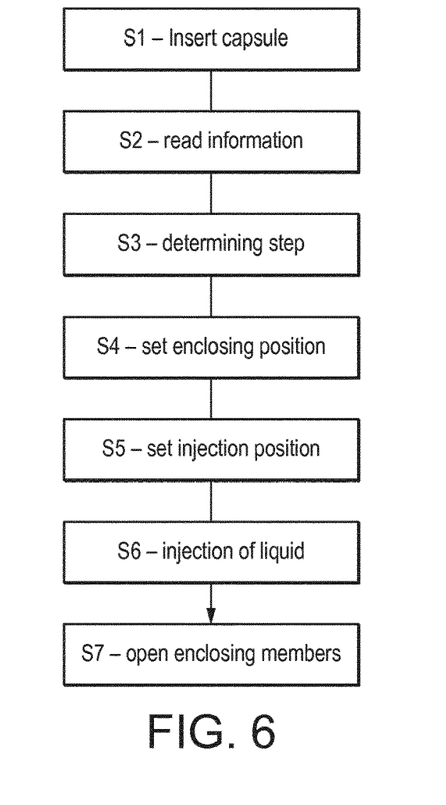
FIG. 6 shows a flow chart relating to a preferred embodiment of the method according to the invention.

FIG. 6 relates to a flow chart describing the steps of a preferred embodiment of the method according to the invention. Thereby, in a first step S1, a capsule 5 is inserted into the beverage preparation device 100 respectively into the injection module 10 of the device.

In a second step S2, information is read from the capsule. As previously described, this may be obtained by a recognizing means 14 of the device which interact with identification means 5*d* of the capsule and/or which recognize a characteristic of the capsule such as a particular size and/or shape. Alternatively, in step S2 a user may provide information about the particular capsule inserted into the device and/or provide a selection of particular process parameters to be applied for this particular capsule.

In a further step S3, at least a specific capsule insertion position of the first and second enclosing member 1,2 is determined based on the read information and/or based on the user input. This is preferably carried out by the control means 13 of the device. In addition, further parameters of the beverage preparation process may be determined based on the provided information and/or the provided user input, such as in particular a specific capsule injection position of the first and second enclosing member 1,2, a volume, a temperature, and/or a pressure for the liquid to be injected into the inserted capsule. The step of determining may encompass a direct determination based on information read from the capsule or information provided via user input or a determination via comparing the read information and/or the user input with information or data stored in a memory unit of the device.

In a further step S4, the capsule is enclosed in the device by the control means 13 setting the determined enclosing position of the first and second enclosing member 1,2. Thereby, an opening of the inlet face 5a of the capsule takes place.

In a further optional step S5, the determined injection position of the first and second enclosing member 1,2 is set by the control means 13. Thereby, a distance between the respective enclosing members 1,2 is preferably increased again while the opening and injection means 3 preferably still maintain engaged with the inlet face 5a of the capsule.

Subsequently, injection of the liquid into the capsule takes place in step S6. In this step, the control means 13 may optionally vary the particular position of the first and second enclosing member 1,2 with respect to each other and/or may set or vary further parameters such as the liquid pressure, temperature and/or volume. The liquid injection leads to the forming of a beverage upon interaction of the capsule ingredients with the liquid and the subsequent draining of the beverage from the capsule.

After the liquid injection, the control means 13 bring back the first and second enclosing member 1,2 into the capsule insertion position respectively into a capsule ejection position, thereby discharging the used capsule from the receiving chamber 7 between the enclosing members (step S7).

Figure 7:
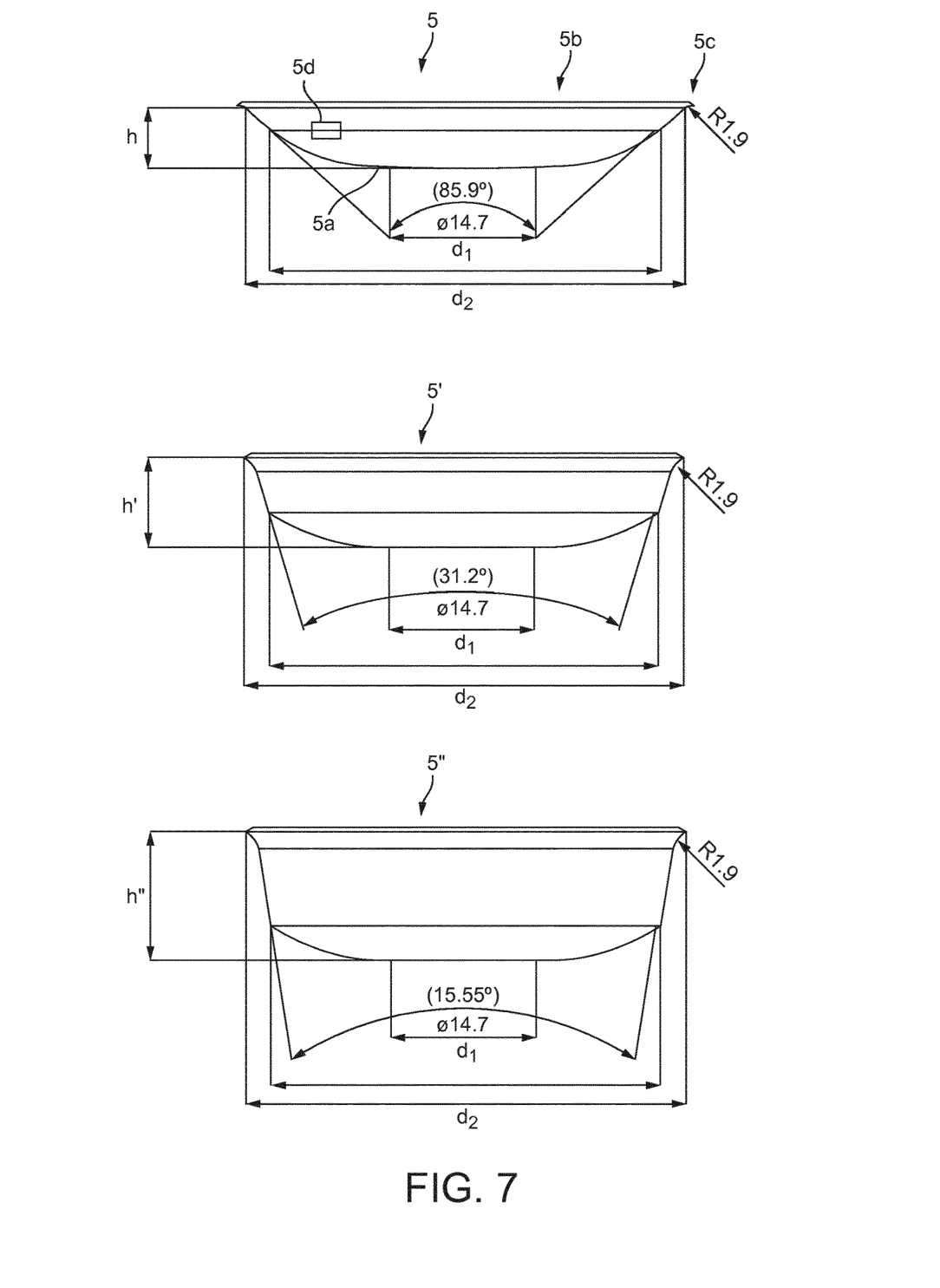
FIG. 7 relates to different capsule types of the system according to the invention.

FIG. 7 relates to different capsule types 5,5',5" of a system according to the invention. As shown in the figures, the capsule types may comprise different characteristics such as shape and/or size and which may be recognized by the beverage preparation device.

In a preferred embodiment, the capsules 5,5',5" all comprise an equal diameter d2 of the flange-like rim portion 5c and/or equal diameter d1 of a central capsule body portion, but differ in their height h,h',h". Alternatively or in addition, the capsules may comprise identification means 5d designed to be recognized and/or read a by the beverage preparation device as previously described. The identification means 5d may for example be a code provided on the outer surface of the capsule.

The different capsule types 5,5',5" as shown in FIG. 7 preferably differ in their ingredient filling degree, in the compaction degree of the ingredients and/or in the granulometry of the ingredients provided in the capsule. The capsules may further differ in their packaging material. The beverage process parameters and in particular at least the enclosing position of the respective capsule in the device may thus be specifically adapted to the particular capsule type and its ingredients for providing optimal preparation parameters.

The invention claimed is:

1. A beverage preparation device for preparing a beverage upon interaction of ingredients provided in a capsule with liquid supplied thereto, the device comprising:
an injection module comprising a first and a cooperating second enclosing member designed for being moved relatively to each other, the first enclosing member being equipped with a capsule opening and injection member for opening a first inlet face of a capsule and injecting liquid into the capsule,
the first and second enclosing members being designed for being brought into at least a first capsule insertion position for inserting a capsule between the enclosing members and a second capsule enclosing position in which the opening and injection member engages the inlet face of the capsule,
the device further comprising a control member designed for adapting the capsule enclosing position by adjusting a distance between the first and second enclosing members based on information read from the capsule and/or based on information provided by a user input.

2. The device according to claim 1,
wherein the control member is designed for adapting the enclosing position during a beverage preparation process with a capsule in the device based on information read from the capsule and/or based on information provided by a user input.

3. The device according to claim 1,
wherein the adjusting the distance between the first and second enclosing members in the capsule enclosing position adapts a penetration depth of the opening and injection member into the capsule at least in the capsule enclosing position.

4. The device according to claim 1, wherein the first and second enclosing members are designed for being brought into at least a third capsule injection position dependent on information read from the capsule and/or based on information provided by a user input.

5. The device according to claim 4,
wherein a distance between the first and second capsule enclosing members in the capsule injection position is greater than the distance between the first and second capsule enclosing members in the capsule enclosing position.

6. The device according to claim 1, wherein the device comprises a recognition member connected to the control member that is designed to read information from the capsule inserted into the device.

7. The device according to claim 6,
wherein the recognition member comprises an optical sensor, an RFID sensor, a magnetic sensor, an electric sensor, an inductive sensor, a mechanic sensor and/or a CCD sensor suitable for interacting with an identification member provided on the capsule and/or for sensing a characterization of the capsule such as a shape and/or size of the capsule or of one of its constituting parts.

8. The device according to claim 1,
wherein the device comprises a user interface for providing information as to the particular capsule type inserted into the device.

9. The device according to claim 1,
wherein the capsule opening and injection member of the first enclosing member comprises a shower plate comprising a plurality of protruding hollow piercing elements such as needles.

10. A system for preparing a beverage, the system comprising a capsule and further comprising a beverage preparation device for preparing a beverage upon interaction of ingredients provided in the capsule with liquid supplied thereto, the device comprising:
an injection module comprising a first and a cooperating second enclosing member designed for being moved relatively to each other, the first enclosing member being equipped with a capsule opening and injection member for opening a first inlet face of a capsule and injecting liquid into the capsule,
the first and second enclosing members being designed for being brought into at least a first capsule insertion position for inserting a capsule between the enclosing members and a second capsule enclosing position in which the opening and injection member engages the inlet face of the capsule,
the device further comprising a control member designed for adapting the capsule enclosing position by adjusting a distance between the first and second enclosing members based on information read from the capsule and/or based on information provided by a user input and a capsule containing a predefined amount of beverage ingredients.

11. The system according to claim 10, wherein the capsule comprises an identification member and/or a characteristic designed to be read respectively recognized by a sensor of the device.

12. The system according to claim 10, wherein the system comprises different types of capsules which differ in their respective shape and/or sizes.

13. A beverage preparation device for preparing a beverage upon interaction of ingredients provided in a capsule with liquid supplied thereto, the device comprising:

an injection module comprising a first and a cooperating second enclosing member designed for being moved relatively to each other, the first enclosing member being equipped with a capsule opening and injection member for opening a first inlet face of a capsule and injecting liquid into the capsule, the first and second enclosing members being designed for being brought into at least a first capsule insertion position for inserting a capsule between the enclosing members and a second capsule enclosing position in which the opening and injection member engages the inlet face of the capsule, the device further comprising a control member designed for adapting the capsule enclosing position based on information read from the capsule and/or based on information provided by a user input, wherein the control member is designed for adapting a distance between the first and second enclosing member respectively a penetration depth of the opening and injection members into the capsule at least in the capsule enclosing position.

* * * * *